United States Patent [19]

Swindler

[11] 4,303,093

[45] Dec. 1, 1981

[54] HYDRANT VALVE

[75] Inventor: Henry A. Swindler, Tustin, Calif.

[73] Assignee: Parker-Hannifin Corporation, Cleveland, Ohio

[21] Appl. No.: 94,604

[22] Filed: Nov. 15, 1979

[51] Int. Cl.³ .................. F16K 37/28; F16K 31/12
[52] U.S. Cl. ..................... 137/315; 137/614.06; 251/35; 251/43; 251/128; 251/291
[58] Field of Search ........... 251/35, 43, 291, 128, 251/114, 116, 66; 137/614, 614.06, 315

[56] References Cited

U.S. PATENT DOCUMENTS

| 1,301,557 | 4/1919 | Valley | 251/66 |
|---|---|---|---|
| 2,693,816 | 11/1954 | Hoelzer | 137/614.06 |
| 2,943,636 | 7/1960 | Reed et al. | 251/43 |
| 3,034,554 | 5/1962 | Griswold | 137/614.06 |
| 3,206,158 | 9/1965 | Bloomquist | 251/43 |
| 3,358,708 | 12/1967 | Williams | 137/614.06 |
| 3,610,571 | 10/1971 | Cisco | 251/43 |
| 3,971,405 | 7/1976 | Millar | 137/489 |
| 4,078,577 | 3/1978 | Brown | 137/614 |

FOREIGN PATENT DOCUMENTS

| 1117695 | 5/1956 | France | 251/114 |
|---|---|---|---|
| 726974 | 2/1966 | United Kingdom | 251/128 |

*Primary Examiner*—Martin P. Schwadron
*Assistant Examiner*—A. Michael Chambers
*Attorney, Agent, or Firm*—Joseph B. Balazs

[57] ABSTRACT

A servo valve controlled hydrant valve for aircraft fueling has a removable adaptor for the hose coupling and includes a clamping device which assures that the servo valve is deactuated before the adaptor housing can be unbolted for removal. Deactuation of the servo valve closes the vent line in a piston-cylinder main valve arrangement thereby assuring closure of the main valve.

5 Claims, 4 Drawing Figures

HYDRANT VALVE

BACKGROUND OF THE INVENTION

This invention relates to hydrant valves for the filling of aircraft fuel tanks and the like and more particularly to a safety device for the servo controlled type of hydrant valve wherein a pilot operation of main valve activity is provided. In devices of this type it is usual to have the hydrant valve in the form of a main body portion and a replaceable adaptor secured thereon with appropriate valving mechanisms contained within the housing thus formed. The valving controls the flow of fuel into the hydrant and from the hydrant into the hose coupling and hose leading to the aircraft. The hydrant valve is typically situated in an underground environment and is subject to contamination even though dust caps and covers are provided. Further, the adaptor cap is subject to great abuse in being coupled to very heavy hose coupling devices. Therefore, it is common to need replacement of the adaptor or to gain access to the interior of the hydrant valve for cleaning of contaminants therein or for replacement of valve structures and the like. It is mandatory when removing the adaptor that flow of fuel within the hydrant valve be terminated and this can be accommodated by a manual shut-off valve, a normally-closed pressure responsive servo valve or the like. However, since it is possible to forget to close shut-off valves or to release the override for the automatic servo valve, which is commonly provided by means of a latching detent mechanism, it is desirable to assure that such valve closure has occurred or that such detent mechanism has been disengaged prior to removal of the adaptor housing.

One of the devices disclosed for effecting an interlock between main valve closure and removal of an adaptor structure is shown in the W. F. Hoelzer U.S. Pat. No. 2,693,816. Here it is taught that an interference mechanism of the spokes on a hand wheel which overlie the actuating spindle for the main fuel valve will require closure of the latter and removal of an actuating wrench before the hand wheel can be turned to loosen the adaptor.

Other hydrant couplers having devices therein for controlling the pressure or flow of fuel therein are shown in the Griswold U.S. Pat. No. 3,034,544 and Miller U.S. Pat. No. 3,971,405, the former including an interlock mechanism.

SUMMARY OF THE INVENTION

In the hydrant valve of this invention a piston-cylinder main valve assembly controls inlet pressure to the interior of the hydrant valve comprising a body housing and an adaptor cap bolted thereto which cap is removable for replacement purposes or for access to the interior of the valve. A servo valve assembly controls positioning of the main valve, providing a controlled venting of the fluid pressure in the cylinder in a manner well understood in the art. The servo valve comprises a check valve and an actuator portion which may be manually or pneumatically operated. The actuator portion serves to open the check valve thereby allowing venting of the cylinder pressure into a downstream cavity of the valve.

The actuator portion of the servo valve assembly is biased both by the fluid pressure within the cylinder and the return spring of the check valve to a deactuated position. The position may be separate of the hydrant valve body assembly, but in any event, is a position where the actuator no longer interferes with the check valve and the latter is closed to prevent further venting of the cylinder, thereby maintaining the main valve in the closed position. A yoke shaped clamp is used to surround a part of the actuator portion of the servo valve assembly to maintain the latter in engaged position in the valve body. The clamp includes a projection thereon which overlies one of the cap screws which are used to secure the adaptor to the valve body, thereby requiring that the clamp be removed before access can be obtained to the interior of the structure.

In a preferred embodiment of the invention the servo valve assembly is a spring loaded manually operated plunger which includes a detent mechanism for retaining the plunger in the actuated position, in engagement with the check valve. In this instance removal of the clamp obviates the function of the detent mechanism and the complete actuator portion of the servo valve assembly is forced from the hydrant valve body by fluid pressure acting against the plunger portion therein as well as by the bias of the check valve spring. In another embodiment of the invention the servo valve assembly comprises a piston and cylinder arrangement for providing fluid actuation from a remote source which could include a dead man control therein. Again, even in those instances wherein the dead man control might be circumvented by wedging same open or the like, removal of the clamp, to gain access to the cap screw mounting the adaptor housing, releases the actuator portion of the servo valve assembly to allow same to be forced from the valve body, thereby assuring closure of the main valve.

An auxiliary shut-off mechanism is also provided for manually closing the vent path from the cylinder in order to entirely disable the servo valve assembly for repair purposes, or the like.

DETAILED DESCRIPTION OF THE DRAWING

Figure 1:
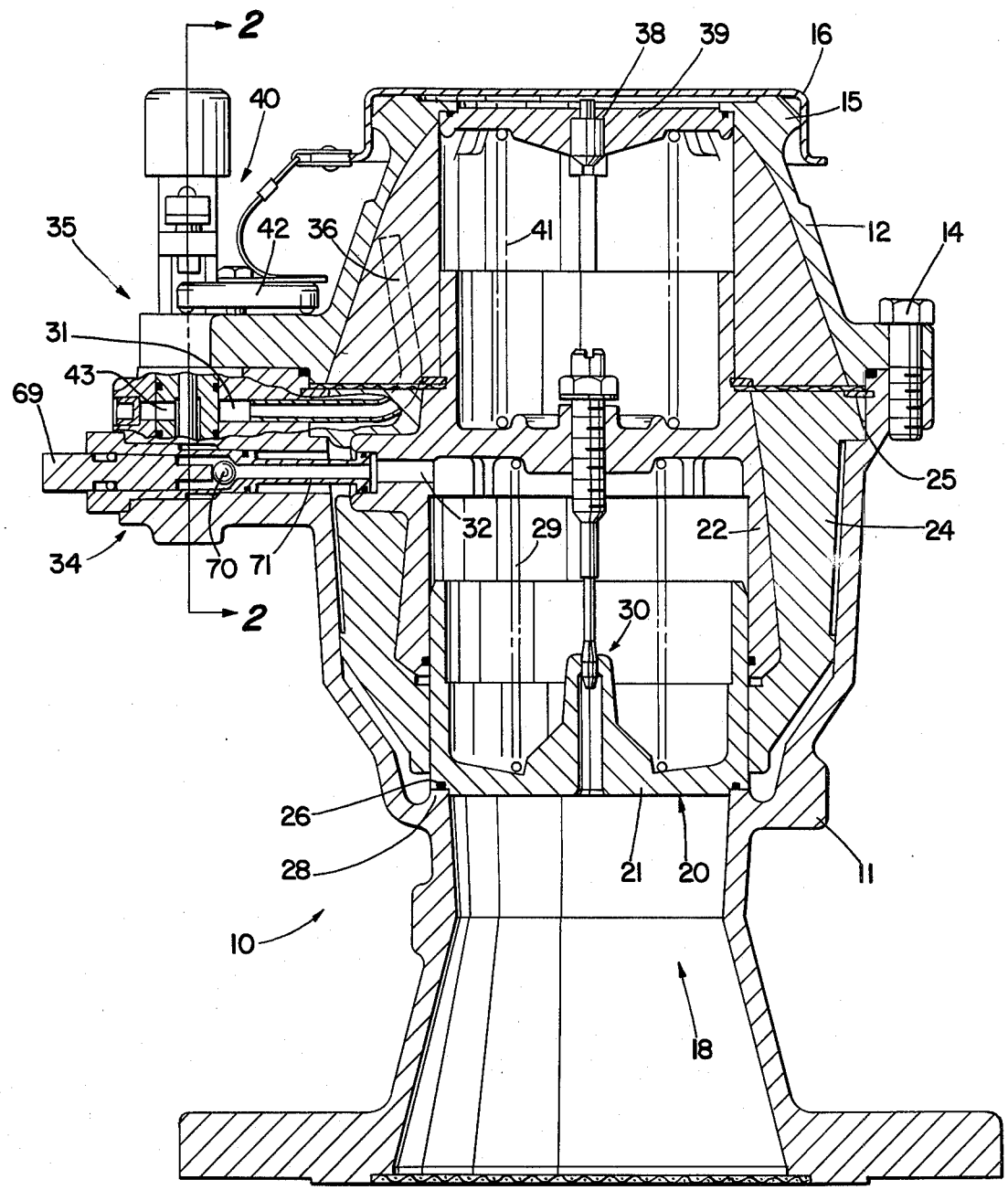
FIG. 1 is a vertical cross-sectional view of the hydrant showing the auxiliary shut-off valve and the relative location of the servo valve assembly.

Referring now to FIG. 1, the hydrant valve 10 consists of a lower body housing 11 and an upper adaptor cap or housing 12 secured to the former by a plurality of cap screws or bolts 14 circumferentially spaced about mating flanges on the respective housings. The adaptor 12 includes a flange 15 in its upper portion adapted for engagement with the hose coupling of a hose for fueling aircraft or the like with fuel delivered from the hydrant valve. A dust cap 16 is normally placed over the flange 15 of the adaptor when the hydrant valve is not in use to prevent the entry of foreign material as the hydrant valve 10 is typically located below ground level.

An inlet 18 is formed in the lower portion of the housing 11 being in communication with a below-ground level source of fuel for delivery of fuel to the hydrant valve. A pressure operated main valve 20 is situated at the inlet of the hydrant valve, the main valve 20 comprising piston 21 supported for sliding movement in cylinder 22. The cylinder 22 is supported within the lower body housing 11 by means of plural radially extending support struts 24, the latter in turn being secured in the body housing 11 by means of main retaining ring 25.

The piston 21 of the main valve 20 carries on its lower face, seal 26 which cooperates with valve seat 28 formed in the lower body housing 11 for control of fuel to the interior of the hydrant valve. Piston 21 is biased to the valve closed position by means of spring 29 in cylinder 22 and further, comprises a differential area piston which is also biased toward the valve closed position by means of inlet fuel pressure. Inlet fuel is routed to the interior of the cylinder 22 by means of the metering assembly 30 consisting of a port in the central face of piston 21 and a cooperating tapered metering pin supported by the bottom wall of cylinder 22.

In order to open the main valve 20 the fluid pressure in cylinder 22 must be relieved and this is accommodated by means of a bleed passage 31 which vents the interior of cylinder 22 to the downstream side of the main valve 20 in a controlled manner. The bleed passage 31 comprises outlet port 32 of the cylinder 22, in communication with an auxiliary cut-off valve structure 34, further in communication with a servo valve assembly 35, the latter in turn being ported to the interior of the adaptor housing 12 which is the downstream side of the main valve 20, by means of bent tube 36. In non-service conditions the servo valve 35 is in a deactuated condition thereby closing the bleed passage 31 thus assuring that piston 21 is biased against the valve seat 28 to prevent the entry of fuel to the interior of the hydrant valve 10.

In service, a typical opening sequence for the hydrant valve 10 comprises removal of the dust cap 16 and coupling of the hose coupler (not shown) to the flange 15 of the adaptor 12. During initial contact of the hose coupler, there is engagement with the plunger of a release valve 38, relieving downstream pressure and allowing outlet poppet 39 to be moved from its seat against the bias of spring 40. With coupling completed, outlet poppet 39 remains in the open position. Actuation of the servo valve 35 by means of depression of a plunger therein then opens the bleed passage 31 allowing venting of the cylinder 22 and opening of the main valve 20 in response to inlet fluid pressure. The main valve 20 then acts as a demand valve delivering fluid flow to the interior of the hydrant 10 as a function of downstream pressure. Typically an external valve is coupled to the hose to provide control over the flow of fuel from the hydrant, the servo valve 35 in this instance being locked into an actuated position by a detent and the inlet piston 21 responding to differential pressures to open and close the main valve 20.

Upon completion of the fueling operation and prior to removal of the hose coupler the servo valve 35 must be deactuated to close the bleed passage 31 and assure that the main valve 20 is closed, this being the operator's responsibility. While coupling and uncoupling of the hose could be affected while the servo valve is in the actuated position due to the protection afforded by the outlet poppet 39, such is not a preferred procedure, since by deactuation of the servo valve 35, a duel safeguard is provided by means of the main valve 20 closure and the back-up of the outlet poppet valve 39.

For access to the interior of the hydrant valve 10 for purposes of repair of the outlet poppet 39, or for cleaning the interior of any contaminants that may have lodged therein or for replacement of the adaptor 12 due to damage of the mounting flange 15 or the like it is necessary to assure that pressure within the adaptor housing 12 has been dissipated. Such safeguard is provided by an interlock mechanism 40 comprising a clamp 42 which secures the servo valve 35 in position and which also covers one of the mounting bolts 14 for the adaptor cap 12. Thus in order to remove the adaptor 12, clamp 42 must first be removed to expose at least one of the mounting bolts 14, the removal of the clamp causing automatic deactuation of the servo valve 35 as described more fully hereinafter.

Figure 2:
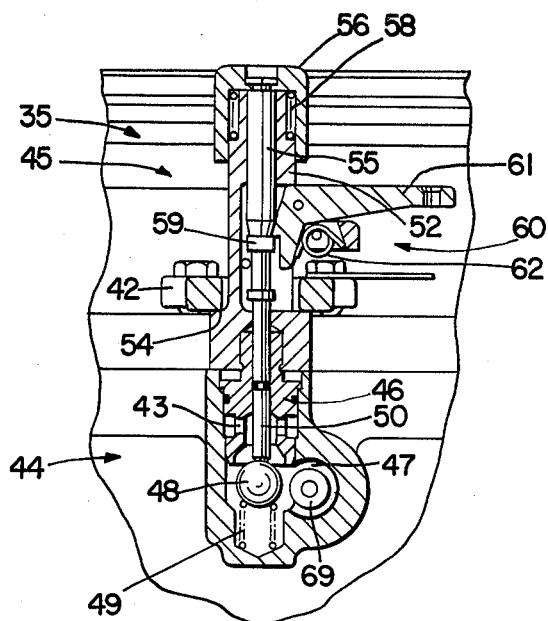
FIG. 2 is a sectional view of the servo valve assembly taken generally along line 2—2 of FIG. 1.

Referring now more particularly to FIG. 2, the servo valve 35 is shown as comprising a check valve portion 44 and an actuator portion 45. The check valve portion 44 comprises a body member 46 secured in a vertical bore in the body housing 11 by means of a retaining ring and forming at its lower portion a seat for the check valve poppet. The vertical bore in the housing 11 communicates with a cross bore 47 which houses the auxiliary shut-off valve structure 34 providing communication with the interior of the cylinder 22. The check valve portion 44 includes a ball poppet 48 and a return spring 49 for urging the ball 48 to the normally closed position in the seat of the body member 46. The body member 46 further includes a cross bore 43 at its central portion, comprising a further part of the bleed passage 31 and in communication with the bent tube 36 for venting fluid to the downstream side of the main valve 20. The body member 46 also includes a vertical bore and slidably supports therein a cylindrical stem 50 which carries a seal thereon and which passes through the check valve seat of the body member into engagement with the ball poppet 48 thereby being urged upwardly with the ball poppet by means of return spring 49. Since the stem 50 carries a seal member thereon it is responsive as well to fluid pressure in the bleed passage 31 and in particular to that fluid pressure within the cylinder 22, and is urged upwardly in the body member 46.

The actuator portion 45 of the servo valve 35 also comprises a generally cylindrical body member 52 having an enlarged diameter lower portion providing a shoulder 54 which serves as a surface for engagement by the clamp 42 for retaining the actuator portion 45 in position on the lower body housing 11. A central bore in the actuator body member 52 slidably supports the actuator stem 55 which together with the stem 50 in the lower body member 46 comprise the plunger assembly for the servo valve 35.

A cap 56 is secured to the upper end of the actuator stem 55 and is urged to an upper position by means of return spring 58. A ledge 59 is provided on the actuator stem 55 for cooperation with detent mechanism 60 comprising the pivoted catch arm 61 and coil spring 62.

Thus, actuation of the servo valve 35 consists of depression of the cap 56, typically by the foot of the operator, to depress the plunger stems 50, 55, the former into engagement with the ball poppet 48 against the bias of return spring 49 thereby opening the bleed passage 31. The plunger stems 50, 55 are retained in this position until the detent mechanism 60 is released by upward movement of lever arm 61 whereby plunger stem 50, 55 and ball poppet 48 will be urged upwardly by the concerted action of return spring 49, cap spring 58 and the bias provided by fluid pressure in cylinder 22 acting against the seal on the lower plunger stem 50. Sufficient travel is provided such that the ball poppet 48 fully seats in body member 46 to close the bleed passage 31.

Figure 3:
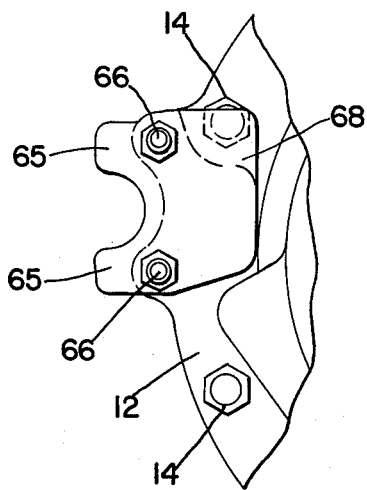
FIG. 3 is a partial plan view of the hydrant valve showing the clamp in relation to the adaptor cap and the servo valve assembly.
Figure 4:
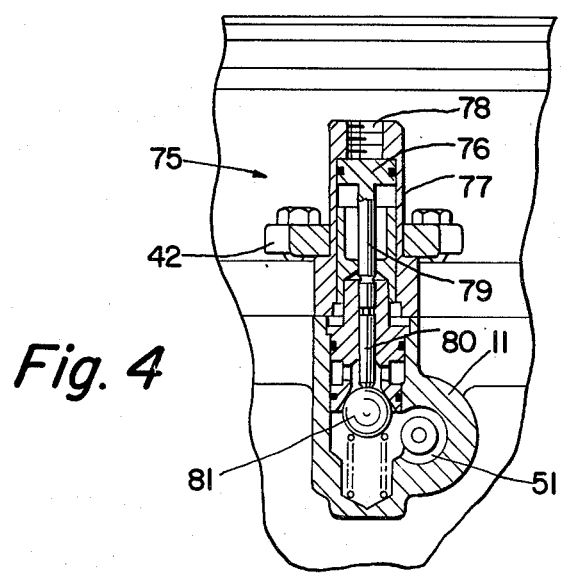
FIG. 4 is a partial sectional view of a second embodiment of the invention showing a portion of the servo valve assembly similar to that of FIG. 2.

As seen more clearly in FIG. 3 clamp 42 comprises a part having a pair of legs 65 thereon in the form of a yoke which overlies the shoulder 54 of the actuator member 45 to retain the latter in engagement with the body member 11 and to retain the actuator stem 55 in the central bore of the lower body member 46 of the check valve portion. The clamp 42 is secured in place on the adaptor cap 12 by means of a pair of bolts 66 passing through the plate and threaded into the adaptor cap. The clamp further includes a recess 68 at a corner thereof providing clearance for one of the cap screws 14 securing the adaptor to the body member 11, a portion of the clamp 42 overlying that cap screw and interfering with and preventing its removal without the prior removal of the clamp 42. Once the clamp 42 has been displaced by removal of bolts 66, the actuator portion 45 will no longer be fixed to the body member 11 and will be urged away from the body member by means of the force exerted by the return spring 49 and the fluid pressure force acting upon the check valve stem 50. Either of these forces is typically sufficient to move the plunger assembly stems 50, 55 upwardly causing displacement of the actuator portion 45 from the remainder of the servo valve assembly 35, but in any event of sufficient movement or displacement to allow complete closure of check valve 48. As seen most clearly in FIG. 1 auxiliary shut-off valve 34 comprises a threaded stem 69 which urges a ball closure member 70 into engagement with a seat to close a channel communicating with the interior of the piston 22 by means of the tubular structure 71.

Referring now to FIG. 3 another embodiment of the invention is depicted in a cross-sectional view similar to that of FIG. 2 wherein a portion of the fluid actuated servo valve assembly 75 is shown. In this embodiment of the invention the upper portion of the actuator portion of the servo valve consists of a piston 76 and cylinder 77 arrangement having a port 78 for connection to a remote source of fluid under pressure, again typically that of a dead man control on a fueling cart. With air pressure in the port 78 actuator piston 76 is moved downwardly together with the actuator stem 79 fixed to the piston 76, to urge the check valve stem 80 into engagement with the ball poppet 81 in a manner similar to that described in reference to the FIG. 2 embodiment of the invention. Automatic displacement of the fluid actuated servo valve 75 is also similar to that described with reference to the FIG. 2 embodiment of the invention in that the actuator portion of the servo valve assembly 75 will be displaced from the body housing 11 when the clamp 42 is removed under the urging of the return spring on the ball poppet 81 and the fluid pressure bias on the check valve stem 80.

I claim:

1. A hydrant valve wherein fuel flow through the valve is prevented upon partial disassembly of the valve for service procedures, comprising a valve body, an adaptor cap secured to said valve body by a plurality of bolts, a piston and cylinder main valve arrangement for controlling fuel flow at the inlet of said valve body, said piston being urged to the valve closed position by fluid under pressure within said cylinder, means to allow said fluid flow into said cylinder, means for exhausting pressure in said cylinder to allowing said piston to move to a valve-open position in response to inlet fluid pressure, said exhaust means comprising a bore in fluid communication with said cylinder for venting said cylinder downstream of said valve inlet, a check valve in said bore, said check valve being normally biased to a closed position to prevent flow of fluid through said bore, an actuator releasably mounted on said valve body, said actuator being operable to control flow of fluid through said main valve and comprising a plunger engageable with said check valve for moving said check valve to an open position to allow flow of fluid through said bore, and mounting means for releasably securing said actuator on said valve body, said mounting means further comprising interlock means operatively associated with said mounting bolts for said adaptor cap to prevent removal of at least one of said bolts prior to removal of said actuator, whereby removal of said adaptor cap is prevented without release of said mounting means and said actuator to provide closure of said check valve.

2. The valve as set forth in claim 1 wherein said means for exhausting pressure is manually operable between actuated and non-actuated positions, and further including detent means for locking said actuator portion in the actuated position, said detent means being separable with said actuator portion.

3. The hydrant valve set forth in claim 1 wherein said check valve is a spring biased poppet valve, said plunger is a stem in operative engagement with said check valve and movable to a position to prevent seating of said poppet valve, and said poppet valve spring biases said stem outwardly from said hydrant valve body.

4. The hydrant valve set forth in claim 3 wherein said mounting means in a clamp releasably secured to said hydrant valve body, said clamp having a first portion thereon for securing said actuator to said valve body and a second portion overlying at least one of said bolts securing said adaptor cap.

5. The hydrant valve set forth in claim 1, wherein said check valve actuator comprises a fluid pressure piston and cylinder actuator means.

* * * * *